3,060,704
REFRIGERATION EQUIPMENT
Allan S. Miller, Hereford, England, assignor to Denco Miller Limited, Hereford, England
Filed Nov. 14, 1960, Ser. No. 69,019
Claims priority, application Great Britain Nov. 20, 1959
4 Claims. (Cl. 62—503)

This invention relates to refrigeration equipment, and more particularly to a capacity regulator.

Cooling by direct expansion of a refrigerant from the liquid phase to the vapour phase is known to have advantages over indirect cooling methods such as the circulation of cooled brine, and enables a smaller and less expensive refrigerating plant to be utilised.

A disadvantage however, of the direct expansion method is that it is difficult to regulate the refrigerating capacity when the plant is operating considerably below its own capacity. Consequently, the cooling coil tends to become frosted because evaporation temperatures have been lowered.

The invention also relates to an arrangement for defrosting a refrigeration system. A constant pressure expansion valve can be used only with an almost constant load, otherwise there is a danger of liquid refrigerant flooding into the crank case of the compressor.

Known automatic capacity regulators are of two main types. The simpler type consists of an automatic by-pass valve connected between the suction and discharge pipes on the compressor. Although preventing too great a drop in the back-pressure, this type of valve cannot maintain an accurate evaporation pressure, and if it is in operation for any length of time, the continuous recirculation of hot gases which is permitted to occur may lead to overheating of the compressor.

The other known type of control is an automatic back-pressure regulator which can be adjusted to maintain a particular evaporation pressure. As well as being expensive, this acts as a throttle on the suction return line, that is, it creates a low pressure condition on the suction side of the compressor, so that a low pressure safety switch cannot be used. A further effect is to create a vacuum in the compressor crankcase, which is undesirable.

In general, any restriction in the suction line of a refrigeration plant reduces the efficiency of the operating cycle, and is to be avoided if possible.

An object of the invention is to provide a capacity regulator effective from 0 to 100% load.

The invention consists of a capacity regulator for a refrigerating system incorporating a constant pressure expansion valve supplying an evaporator which in turn supplies a compressor, comprising a liquid trap provided between the evaporator and compressor and heated by the compressor output.

The invention further consists of an arrangement for defrosting a refrigeration system as described above, which comprises a solenoid valve connected in parallel with the expansion valve whereby on opening the solenoid valve liquid refrigerant passes through the evaporator coils to be defrosted and evaporates in the liquid trap.

The invention will be further described with reference to the accompanying drawings in which.

Figure 1:
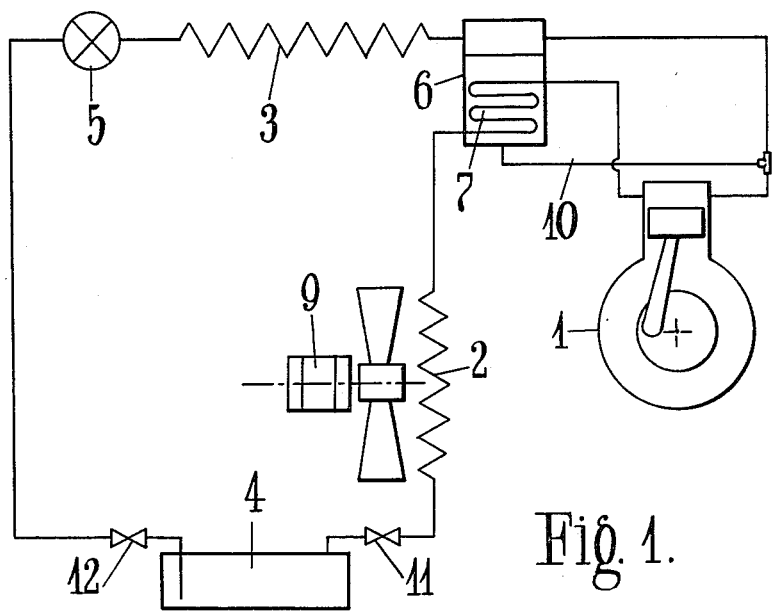
FIGURE 1 shows a diagrammatic layout of the whole operating circuit.

Referring first to FIGURE 1, a compressor 1 pumps the refrigerant vapour through a coil 7 in a liquid trap or capacitor 6 and through a condenser coil 2 in series with this which is cooled by a fan 9. The condensed liquid passes through a valve 11 of conventional construction and into a liquid reservoir 4, travelling from here via another valve 12 to a pre-set constant pressure expansion valve 5. Here it expands and vaporises in the evaporator coils 3, passing back to the compressor via the capacitor 6, which is the control device of the invention.

Although the device is operable without it, an oil return line 10 of small bore is incorporated from the capacitor 6 to the compressor, to feed back into the crankcase any oil falling into the capacitor. A solenoid valve, arranged to close when the compressor stops, would normally be fitted in this oil line to prevent liquid refrigerant entering the compressor.

Figure 2:
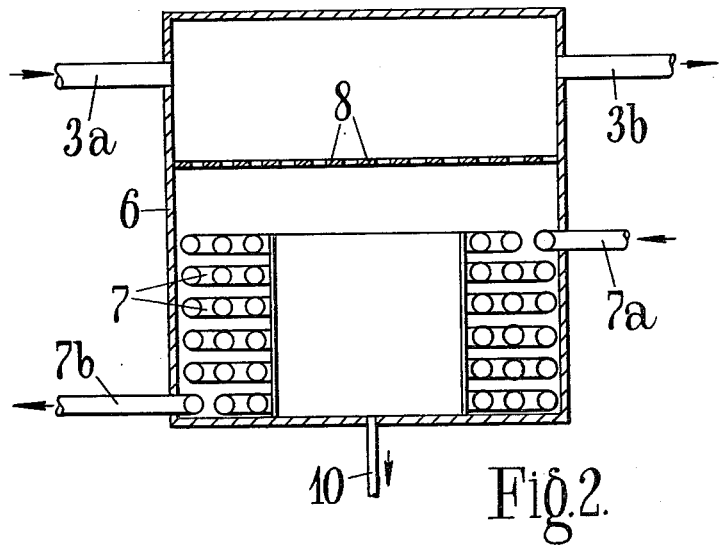
FIGURE 2 is an axial cross-section of the control device of FIGURE 1 in more detail.

If the evaporator load drops, the expansion valve 5 will allow more liquid refrigerant through than can be vaporised. This liquid will accordingly pass as seen in FIGURE 2 through the evaporator coil into the capacitor 6 via inlet 3a and will drop through a perforated plate 8 on to the hot coils 7. 7a shows the inlet from the compressor and 7b the outlet to the condenser. The liquid then boils and the vapour produced is fed back to the compressor via the outlet 3b.

It will be observed that in every figure there is shown a partition in the liquid trap and that moreover the connections to the evaporator coils and the compressor are always made to the top of the liquid trap. With such a configuration it is ensured that substantially no vapour comes into heat-exchange relationship with the coils 7 and that therefore the heat of coils 7 is taken up by evaporating the liquid refrigerant and giving a vapour at the boiling temperature of the liquid. Thus, the vapour passing into the compressor has not had its sensible heat increased because the heat supplied at coils 7 has been taken up by the latent heat of evaporation of the liquid.

If the evaporator is on full load, all the refrigerant liquid will vaporise in the coils 3 and the coils 7 will have no effect, whereas if there is no load on the evaporator, all the refrigerant will be spilled into the capacitor and boiled by the coils 7. The volume of the capacitor is such that it could contain the entire refrigerant charge if necessary.

This is obviously necessary for defrost applications as described more fully below and in fact even under working conditions sudden fluctuations in load may send very large quantities of liquid into the trap.

Figure 3:
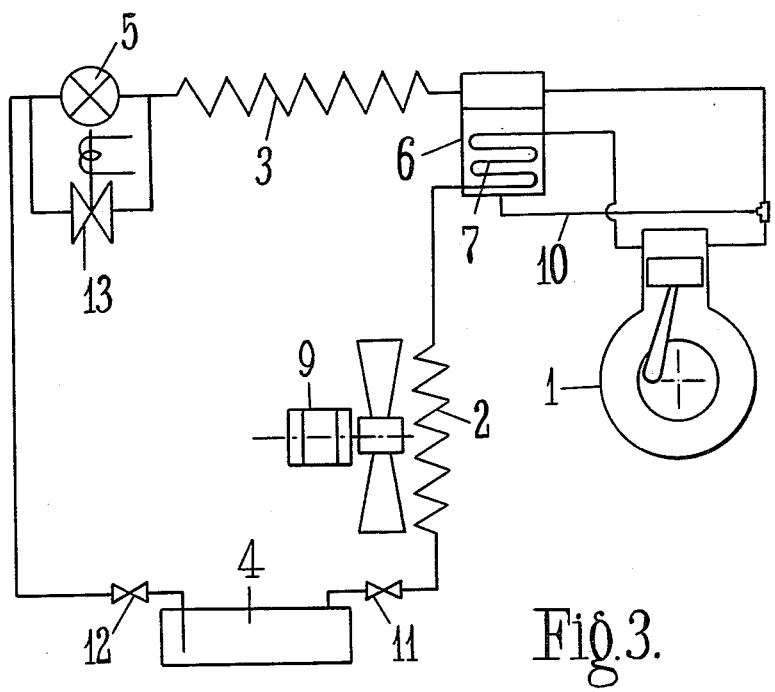
FIGURE 3 shows the operating circuit of FIGURE 1 with the defrosting arrangement in position.

The device for defrosting the above arrangement is the solenoid valve 13 shown in FIGURE 3 mounted in parallel with the expansion valve 5, which may be of automatic or thermostatic type.

During normal operation the solenoid valve 13 is closed and the plant performs as a normal refrigeration system. To defrost the evaporator the solenoid valve is opened. The solenoid valve 13 allows a greater throughput of refrigerant than does the expansion valve and causes the evaporator pressure and temperature to rise.

For example the orifice in the solenoid valve can be sized so as to allow a pressure rise in the region of 45 p.s.i. which in the case of Freon 12 as a refrigerant, would correspond to an evaporation temperature of 49° F. Now the evaporator 3, which is coated with ice, is at a temperature below 32° F. so that no evaporation can take place within the tubes when the liquid refrigerant is passed through because the evaporation temperature has been set at a temperature above 32° F. Instead warm liquid passes through and spills into the capacitor 6 where it evaporates.

During the defrost period, it is preferable, although not essential, to switch off the condenser fan 9 so as to increase the temperature of the liquid refrigerant. The heat available for defrosting is equal to the heat equivalent of the electrical energy used to drive the compressor.

It has been found possible with the refrigerating system according to the invention to maintain a constant pressure in the system under conditions of no load to full load on the evaporator. If there is no load on the evaporator, the vaporisation/condensation cycle takes place within the capacitor vessel, thereby preventing liquid refrigerant from entering the compressor.

Although it is to be noted that generally a constant pressure expansion valve would be used in conjunction with this device, other types of flow control valves can be used for special applications, such as where the refrigerant through the evaporator is regulated by a temperature controller through a special control valve. Normally such form of control could not be used because there would be no fixed relationship between the cooling load and the quantity of refrigerant fed into the evaporator. Consequently, liquid refrigerant would enter the compressor. The capacitor device enables any form of refrigerant flow control valve to be used without any risk of liquid refrigerant entering the compressor.

Various modifications may be made within the scope of the invention.

I claim:

1. In a refrigerating system comprising a compressor for refrigerant charge having an inlet and an outlet, condenser coils connected to the outlet to liquify the refrigerant charge, a reservoir for liquid refrigerant connected to the condenser coils, an expansion valve fed from the reservoir, evaporator coils connected to the expansion valve into which coils vaporized liquid refrigerant expands, a liquid trap having an upper and a lower portion, the upper portion being connected to the evaporator coils and to the inlet of the compressor, and means for heating the lower portion only of the trap from the compressor output, the improvement which consists in said liquid trap being of such a size as to contain substantially the whole of the refrigerant charge when in the liquid state, and containing means for screening the vapour components of the refrigerant charge from the heated lower portion of the trap in their passage through the upper portion from the evaporator coils to the inlet of the compressor.

2. A refrigerating system comprising a compressor for refrigerant charge having an inlet and an outlet, condenser coils connected to the outlet to liquify the refrigerant charge, a reservoir for liquid refrigerant connected to the condenser coils, an expansion valve fed from the reservoir, evaporator coils connected to the expansion valve into which coils vaporized liquid refrigerant expands, a liquid trap having an upper and a lower portion the upper portion being connected to the evaporator coils and to the inlet of the compressor, and a coil interposed between the condenser coils and compressor outlet and positioned within the lower portion of the trap for heating said lower portion only from the compressor output, said liquid trap being of such a size as to contain substantially the whole of the refrigerant charge when in the liquid state, and containing means for screening the vapour components of the refrigerant charge from the heated lower portion of the trap in their passage through the upper portion from the evaporator coils to the inlet of the compressor.

3. A refrigerating system comprising a compressor for refrigerant charge having an inlet and an outlet, condenser coils connected to the outlet to liquify the refrigerant charge, a reservoir for liquid refrigerant connected to the condenser coils, an expansion valve fed from the reservoir, a by-pass valve in parallel with said expansion valve, means for opening said by-pass valve, evaporator coils connected to the expansion valve into which coils vaporized liquid refrigerant expands, a liquid trap having an upper and a lower portion, the upper portion being connected to the evaporator coils and to the inlet of the compressor, and means for heating the lower portion only of the trap from the compressor output, said liquid trap containing means for screening the vapour components of the refrigerant charge from the heated lower portion of the trap in their passage through the upper portion from the vaporator coils to the inlet of the compressor, whereby, when the bypass valve is opened, liquid refrigerant passes through the evaporator coils to defrost them and thence passes into the liquid trap, said liquid trap being of such a size as to contain substantially the whole of the refrigerant charge when in the liquid state and thus to prevent passage of liquid to the compressor.

4. A refrigerating system comprising a compressor for refrigerant charge having an inlet and an outlet, condenser coils connected to the outlet to liquify the refrigerant charge, a reservoir for liquid refrigerant connected to the condenser coils, an expansion valve fed from the reservoir, a by-pass valve in parallel with said expansion valve, a solenoid to operate said by-pass valve, evaporator coils connected to the expansion valve into which coils vaporized liquid refrigerant expands, a liquid trap having an upper and a lower portion, the upper portion being connected to the evaporator coils and to the inlet of the compressor, and a coil interposed between the condenser coils and compressor outlet and positioned within the lower portion of the trap for heating said lower portion only from the compressor output, said liquid trap containing means for screening the vapour components of the refrigerant charge from the heated lower portion of the trap in their passage through the upper portion from the evaporator coils to the inlet of the compressor, whereby, when the by-pass valve is opened, liquid refrigerant passes through the evaporator coils to defrost them and thence passes into the liquid trap, said liquid trap being of such a size as to contain substantially the whole of the refrigerant charge when in the liquid state and thus to prevent passage of liquid to the compressor.

References Cited in the file of this patent

UNITED STATES PATENTS

| | | |
|---|---|---|
| 2,405,272 | Smith | Aug. 6, 1946 |
| 2,472,729 | Sidelle | June 7, 1949 |
| 2,570,962 | McBroom | Oct. 9, 1951 |
| 2,621,051 | Kramer | Dec. 9, 1952 |
| 2,637,983 | Malkoff | May 12, 1953 |
| 2,698,522 | La Porte | Jan. 4, 1955 |